May 29, 1934.  E. J. SIMANEK  1,960,716
BRAKE MECHANISM
Filed July 27, 1932
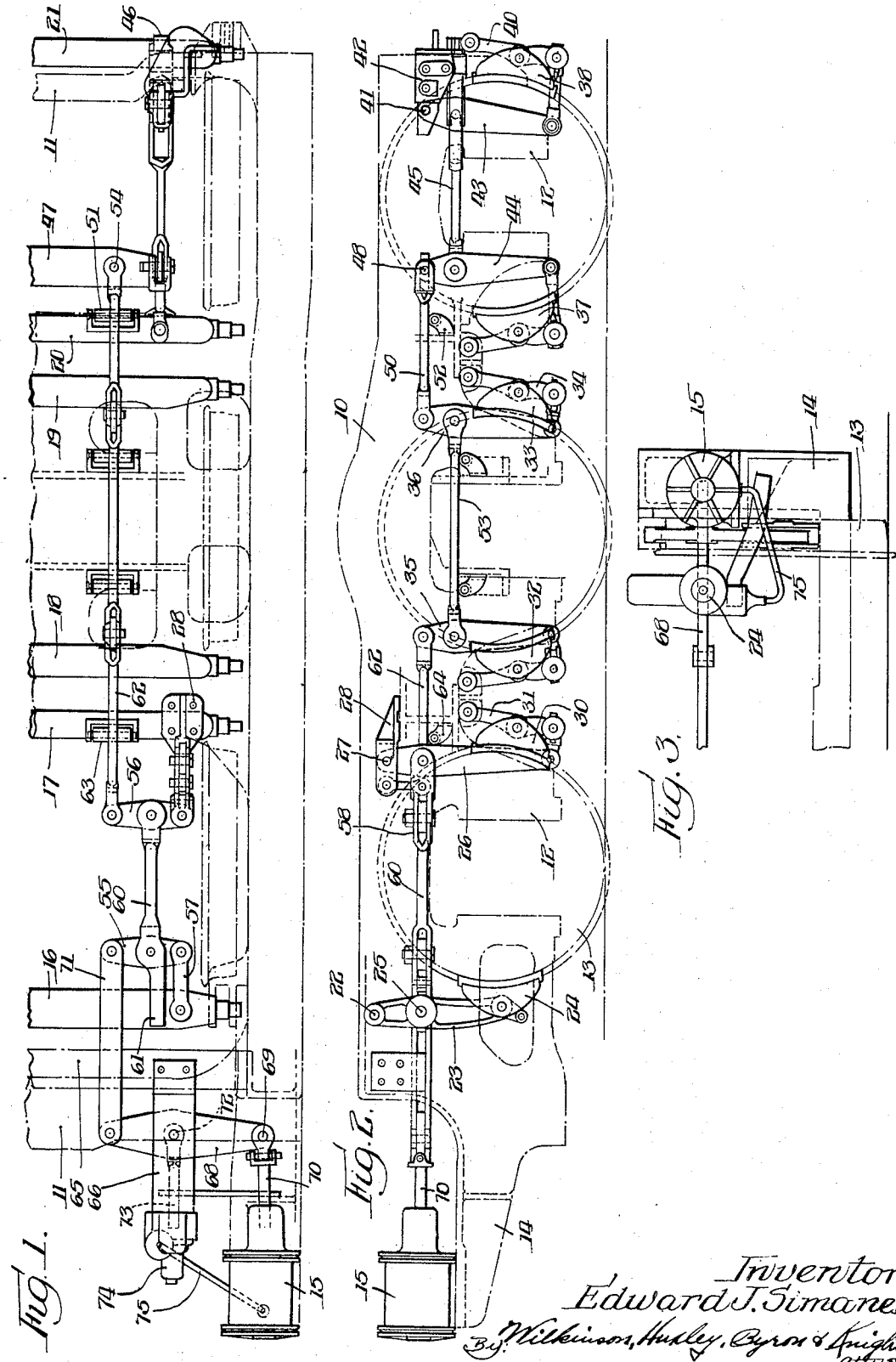
Inventor:
Edward J. Simanek,
By Wilkinson, Huxley, Byron & Knight
attys.

Patented May 29, 1934

1,960,716

UNITED STATES PATENT OFFICE 1,960,716

BRAKE MECHANISM

Edward J. Simanek, Chicago, Ill., assignor to American Steel Foundries, Chicago, Ill., a corporation of New Jersey Application July 27, 1932, Serial No. 624,959

36 Claims. (Cl. 188—46)

The invention relates to improvements in brake mechanism and has particular reference to an improved brake mechanism for auxiliary locomotive trucks.

An object of the invention is to provide brake rigging primarily for use on booster trucks having the motive power means suspended from the truck frame, although the invention is not limited thereto, as any truck having a plurality of pairs of wheels may be equipped with the present brake mechanism.

A further object of the invention is to provide an auxiliary locomotive truck with brake cylinders mounted on brackets projecting from one end of the truck and which have operative connection with suitable brake rigging.

A further object is to provide an improved clasp type of brake rigging for six-wheel railway trucks wherein the brake cylinders will be located to one end of the truck frame and connected to the various brake beams through linkage arranged in a manner to best conform with the structure of the truck frame.

A further object is to provide brake mechanism for rigging which is simple and compact and in which the various connections are short and direct and readily accessible for adjustment or repair.

With these and various other objects in view, the invention may consist of certain novel features of construction and operation, as will be more fully described and particularly pointed out in the specification, drawing and claims appended hereto.

In the drawing which illustrates an embodiment of the device and wherein like reference characters are used to designate like parts—

Figure 1 is a fragmentary plan view of an auxiliary locomotive truck equipped with brake mechanism of the present invention;

Figure 2 is an elevational view of the truck shown in Figure 1; and

Figure 3 is a fragmentary end view looking toward the right of Figure 1.

The type of railway truck with which the present invention is primarily concerned is shown as comprising side frame members 10 joined by transverse end members 11, the members being provided with depending pedestals 12 for receiving journal boxes, not shown, mounted on the ends of wheel and axle assemblies having wheels 13. Each of the side frame members has formed integrally with one end a projecting bracket 14 forming in effect a continuation of the member and serving to support a brake cylinder 15. Inasmuch as the brake mechanism is similar on both sides of the truck the disclosure and description will be limited to one side for a better understanding of the invention.

To each side of the various wheels 13 are located brake beams designated by 16 to 21 inclusive, the brake beam 16 being located above the axle of the wheels, while the remaining beams are located well below the wheel axles. Pivoted to the truck frame at 22 is a dead truck lever 23 carrying at its lower end outside brake heads 24 and having connection at 25 with the end of brake beam 16. To the opposite side of the wheel is located the dead truck lever 26 fulcrumed to the frame at 27 through bracket 28 and having connection at its lower end through a tie link with the brake beam 17. The inside brake head 30 is suspended from the frame by the hangers 31 having pivotal connection with the brake head and secured at its lower end to the end of the brake beam 17. The intermediate car wheel having the brake beams 18 and 19 positioned on opposite sides thereof is provided with brake heads 32 and 33 respectively suspended from the frame by hangers 34 connecting at their lower ends with the ends of the brake beams. The live truck levers 35 and 36 supported from the frame by structure to be presently described also have connection at their lower ends through tie links with the brake beams 18 and 19. The remaining outer car wheel having the brake beams 20 and 21 located on opposite sides thereof is provided with inside and outside brake heads 37 and 38 suspended from the frame by hangers 40, the hangers connecting at their lower ends with the brake beams respectively. Fulcrumed to the frame at 41 through bracket 42 is the dead truck lever 43 having connection with the brake beam 21, while to the opposite side of the wheel and connecting with brake beam 20 is the live truck lever 44.

Connecting the pair of dead and live truck levers 43 and 44 is a tie rod 45 having pivotal connection with the levers intermediate their ends and being equipped with a slack adjuster 46 by means of which the slack in the brake rigging can be taken up. An equalizer lever 47 extends transversely of the truck frame and for connecting the brake rigging on the opposite sides of the frame the lever is pivotally connected at its ends as at 48 to the live truck lever 44. A pull rod 50 supported upon roller 51 journalled in bracket 52 serves to operatively connect the pair of dead and live levers 43 and 44 with the pair of live levers 35 and 36, the latter being connected by means of the tie rod 53. It is to be noted that the pull rod 50 is connected at 54 with the equalizing lever 47 and serves to support the lever and the live truck lever 44 from the frame.

Having association with the brake beams 16 and 17 are a pair of equalizer levers 55 and 56, the former having direct connection through link 57 with the brake beam 16, while the latter has connection to brake beam 17 through the dead truck lever 26 and link 58 pivotally secured to the truck lever and to the end of the equalizer 56. The equalizer levers are connected by pull rod 60 provided with an extension 61 forming a guide therefor and by means of the pull rod 62 supported from the truck frame through roller 63 and bracket 64 the equalizer levers are operatively connected to the pair of live levers 35 and 36.

As previously described each side member 10 is provided with bracket 14 projecting from one end thereof and located in substantial alignment with the member for supporting the brake cylinder 15. The truck frame is provided with a transverse support 65 positioning the spaced strap members 66 adjacent the support, the strap members receiving the cylinder lever 68 having a flexible connection at one end, as at 69, to the push rod 70 of the pressure cylinder and at its other end being pivotally connected to link or pull rod 71 connecting with the equalizer lever 55. The cylinder lever 68 is pivotally supported as at 72 by means of the piston 73 to automatic slack adjuster 74. The slack adjuster, the construction of which is similar to that particularly shown and described in application Serial No. 592,700 of Mitchell, filed February 13, 1932, is pneumatically operated through a by-pass 75 communicating with the brake cylinder 15 and thus through movement of the piston 73 the slack in the brake rigging is adjusted to conform to the travel of the push rod 70 of the brake cylinder.

In operation, to apply the brake shoes to the car wheels the air under pressure is admitted to the brake cylinder, causing travel of the push rod 70 outwardly, rotating the cylinder lever 68 and actuating the equalizer levers 55 and 56 and the brake beams 16 and 17 connecting therewith through the dead truck levers 23 and 26. Brake beams 18 and 19 are also simultaneously actuated as the live levers 35 and 36 have connection through pull rod 62 with the equalizer lever 56 and in a like manner through pull rod 50 the truck levers 43 and 44 connecting with brake breams 21 and 20 are also actuated. The various live and dead truck levers are so located as to conform to the unsymmetrical construction of the truck frame while operating to apply equalized braking pressure to the car wheels. By locating the brake cylinders to the end of the truck on projecting brackets the connecting brake mechanism between the cylinder and rigging provides maximum clearance for the motive power means suspended from the truck frame.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In a brake arrangement, the combination of a truck frame, including a side frame and end connecting members, an integrally formed cylinder bracket formed on said truck frame in substantial longitudinal alignment with said side frame, wheels associated with said truck frame, pairs of interconnected truck levers associated with said wheels, a brake cylinder positioned on said bracket, and means connecting the piston of said cylinder with said interconnected truck levers, the piston of said cylinder operating toward the adjacent end connecting member.

2. In brake mechanism, the combination of a truck frame, including a side frame, a supporting bracket projecting from one end of the side frame and in substantial alignment therewith, a brake cylinder supported on the bracket, pairs of interconnected truck levers, a cylinder lever fulcrumed exteriorly of the frame and connecting with the brake cylinder, and means operatively connecting the cylinder lever with the truck levers.

3. In brake mechanism, the combination of a truck frame, including a side frame, a supporting bracket projecting from one end of the side frame and in substantial alignment therewith, a brake cylinder supported on the bracket, pairs of interconnected truck levers, a cylinder lever, a supporting strap extending from the frame in spaced relation to the bracket, said strap supporting the cylinder lever exteriorly of the frame, and means connecting the cylinder lever with the brake cylinder and truck levers respectively.

4. In brake mechanism, the combination with a truck frame including a side frame member, a bracket integral and projecting from one end of the frame member and in substantial alignment therewith, a brake cylinder supported on said bracket, pairs of interconnected truck levers, equalizer levers forming part of the connecting means for certain of the truck levers, a cylinder lever fulcrumed exteriorly of the frame, and means connecting the cylinder lever with one of the equalizer levers and with the brake cylinder respectively.

5. In a brake arrangement, the combination of a truck frame, including a side frame and end connecting members, an integrally formed cylinder bracket formed on said truck frame in substantially longitudinal alignment with said side frame, a plurality of wheels associated with said truck frame inwardly of said side frame, a dead and live truck lever associated with one of the end wheels and disposed on opposite sides thereof, a pull rod connecting said dead and live levers above the wheel center, live truck levers associated with the adjacent wheel on opposite sides thereof and connected intermediate the ends thereof by a pull rod, a pull rod connecting the ends of said first named live lever and the adjacent live lever of the adjacent wheel, dead levers associated with the other end wheel and disposed on opposite sides thereof, horizontally disposed equalizer levers provided adjacent said last named truck levers, a pull rod connecting said equalizer levers intermediate the ends thereof, one of said equalizer levers being connected adjacent one end thereof to the adjacent live lever of said second named wheel, the other end of said equalizer lever being connected to the inner dead truck lever of said third named wheel, the other equalizer lever being connected adjacent one end thereof to the other of said dead truck levers, a brake cylinder mounted on said bracket having a piston operating in the direction of said end connecting member, a cylinder lever pivoted intermediate the ends thereof to said truck frame and connected adjacent one end thereof to said piston, the other end of said cylinder lever being connected to said other equalizer lever.

6. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith.

7. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith.

8. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, said cylinder operating in the direction of one of said wheels.

9. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, said cylinder operating in the direction of one of said wheels.

10. In a brake arrangement, the combination of a truck frame including a side frame, a cylinder bracket on one end of said side frame and aligned therewith, wheel and axle assemblies disposed in supporting relation to said truck frame, brake rigging associated with said wheels for braking cooperation therewith, operating means for said brake rigging including a cylinder mounted on said bracket substantially below the top of said side frame and in substantially longitudinal alignment therewith.

11. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, a cylinder lever pivoted to said truck frame, one end of said cylinder lever being connected to said brake rigging and the other end thereof being connected to the piston of said cylinder.

12. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, a cylinder lever pivoted to said truck frame, one end of said cylinder lever being connected to said brake rigging and the other end thereof being connected to the piston of said cylinder.

13. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, said cylinder operating in the direction of one of said wheels, a cylinder lever pivoted to said truck frame, one end of said cylinder lever being connected to said brake rigging and the other end thereof being connected to the piston of said cylinder.

14. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, said cylinder operating in the direction of one of said wheels, a cylinder lever pivoted to said truck frame, one end of said cylinder lever being connected to said brake rigging and the other end thereof being connected to the piston of said cylinder.

15. In a brake arrangement, the combination of a truck frame including a side frame, a cylinder bracket on one end of said side frame and aligned therewith, wheel and axle assemblies disposed in supporting relation to said truck frame, brake rigging associated with said wheels for braking cooperation therewith, operating means for said brake rigging including a cylinder mounted on said bracket substantially below the top of said side frame and in substantially longitudinal alignment therewith, a cylinder lever pivoted to said truck frame, one end of said cylinder lever being connected to said brake rigging and the other end thereof being connected to the piston of said cylinder.

16. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, a cylinder lever pivoted to said truck frame and connected to said brake rigging and to the piston of said cylinder.

17. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, a cylinder lever pivoted to said truck frame and connected to said brake rigging and to the piston of said cylinder.

18. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, said cylinder operating in the direction of one of said wheels, a cylinder lever pivoted to said truck frame and connected to said brake rigging and to the piston of said cylinder.

19. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, said cylinder operating in the direction of one of said wheels, a cylinder lever pivoted to said truck frame and connected to said brake rigging and to the piston of said cylinder.

20. In a brake arrangement, the combination of a truck frame including a side frame, a cylinder bracket on one end of said side frame and aligned therewith, wheel and axle assemblies disposed in supporting relation to said truck frame, brake rigging associated with said wheels for braking cooperation therewith, operating means for said brake rigging including a cylinder mounted on said bracket substantially below the top of said side frame and in substantially longitudinal alignment therewith, a cylinder lever pivoted to said truck frame and connected to said brake rigging and to the piston of said cylinder.

21. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, an automatic slack adjuster carried by said truck frame and operatively connected to said cylinder, a cylinder lever pivoted to said slack adjuster, one end of said cylinder lever being connected to said brake rigging and the other end thereof being connected to the piston of said cylinder.

22. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, an automatic slack adjuster carried by said truck frame and operatively connected to said cylinder, a cylinder lever pivoted to said slack adjuster, one end of said cylinder lever being connected to said brake rigging and the other end thereof being connected to the piston of said cylinder.

23. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, said cylinder operating in the direction of one of said wheels, an automatic slack adjuster carried by said truck frame and operatively connected to said cylinder, a cylinder lever pivoted to said slack adjuster, one end of said cylinder lever being connected to said brake rigging and the other end thereof being connected to the piston of said cylinder.

24. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, said cylinder operating in the direction of one of said wheels, an automatic slack adjuster carried by said truck frame and operatively connected to said cylinder, a cylinder lever pivoted to said slack adjuster, one end of said cylinder lever being connected to said brake rigging and the other end thereof being connected to the piston of said cylinder.

25. In a brake arrangement, the combination of a truck frame including a side frame, a cylinder bracket on one end of said side frame and aligned therewith, wheel and axle assemblies disposed in supporting relation to said truck frame, brake rigging associated with said wheels for braking cooperation therewith, operating means for said brake rigging including a cylinder mounted on said bracket substantially below the top of said side frame and in substantially longitudinal alignment therewith, an automatic slack adjuster carried by said truck frame and operatively connected to said cylinder, a cylinder lever pivoted to said slack adjuster, one end of said cylinder lever being connected to said brake rigging and the other end thereof being connected to the piston of said cylinder.

26. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, a cylinder lever movably pivoted to said truck frame, one end of said cylinder lever being connected to said brake rigging and the other end thereof being connected to the piston of said cylinder.

27. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, a cylinder lever movably pivoted to said truck frame, one end of said cylinder lever being connected to said brake rigging and the other end thereof being connected to the piston of said cylinder.

28. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, said cylinder operating in the direction of one of said wheels, a cylinder lever movably pivoted to said truck frame, one end of said cylinder lever being connected to said brake rigging and the other end thereof being connected to the piston of said cylinder.

29. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, said cylinder operating in the direction of one of said wheels, a cylinder lever movably pivoted to said truck frame, one end of said cylinder lever being connected to said brake rigging and the other end thereof being connected to the piston of said cylinder.

30. In a brake arrangement, the combination of a truck frame including a side frame, a cylinder bracket on one end of said side frame and aligned therewith, wheel and axle assemblies disposed in supporting relation to said truck frame, brake rigging associated with said wheels for braking cooperation therewith, operating means for said brake rigging including a cylinder mounted on said bracket substantially below the top of said side frame and in substantially longitudinal alignment therewith, a cylinder lever movably pivoted to said truck frame, one end of said cylinder lever being connected to said brake rigging and the other end thereof being connected to the piston of said cylinder.

31. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, a cylinder lever movably pivoted to said truck frame and connected to said brake rigging and to the piston of said cylinder.

32. In a brake arrangement, the combination of a truck frame including a side frame, wheel and axle assemblies disposed in supporting relation to said truck frame, brake rigging associated with said wheels for braking cooperation therewith, operating means for said brake rigging including a horizontally disposed cylinder mounted below the top of said side frame and in substantially longitudinal alignment therewith, a cylinder lever movably pivoted to said truck frame and connected to said brake rigging and to the piston of said cylinder.

33. In a brake arrangement, the combination of a truck frame including a side frame, wheel and axle assemblies disposed in supporting relation to said truck frame, brake rigging associated with said wheels for brake cooperation therewith, operating means for said brake rigging including a horizontally disposed cylinder mounted below the top of said side frame and in substantially longitudinal alignment therewith, said cylinder operating in the direction of one of said wheels, a cylinder lever movably pivoted to said truck frame and connected to said brake rigging and to the piston of said cylinder.

34. In a brake arrangement, the combination of a truck frame including a side frame, wheel and axle assemblies disposed in supporting relation to said truck frame, brake rigging associated with said wheels for braking cooperation therewith, operating means for said brake rigging including a cylinder mounted below the top of said side frame and in substantially longitudinal alignment therewith, said cylinder operating in the direction of one of said wheels, a cylinder lever movably pivoted to said truck frame and connected to said brake rigging and to the piston of said cylinder.

35. In a brake arrangement, the combination of a truck frame including a side frame, a cylinder bracket on one end of said side frame and aligned therewith, wheel and axle assemblies disposed in supporting relation to said truck frame, brake rigging associated with said wheels for braking cooperation therewith, operating means for said brake rigging including a cylinder mounted on said bracket substantially below the top of said side frame and in substantially longitudinal alignment therewith, a cylinder lever movably pivoted to said truck frame and connected to said brake rigging and to the piston of said cylinder.

36. In brake mechanism, the combination of a locomotive booster truck frame including side frames, said truck frame having a bracket projecting from one end of each of said side frames and disposed wholly below the top of said side frames and beyond the adjacent end of said truck frame, a plurality of pairs of wheels disposed in supporting relation to said truck frame, brake beams disposed on opposite sides of each wheel, truck levers supported from the frame and connecting with the brake beams, tie rods connecting certain of the truck levers in pairs, pull rods connecting the pairs of levers, and a brake cylinder supported on each bracket and having connections to the truck levers on its respective side of the truck frame.

EDWARD J. SIMANEK.